(No Model.) 2 Sheets—Sheet 1.

J. J. HOGAN.
SPLIT PULLEY CLAMP.

No. 473,459. Patented Apr. 26, 1892.

Attest: Inventor.
J. Van Vleet Jr. John J. Hogan, per
E. F. Kinsey Crane & Miller, attys.

THE NORRIS PETERS CO., PHOTO-LITHO., WASHINGTON, D. C.

(No Model.) 2 Sheets—Sheet 2.
J. J. HOGAN.
SPLIT PULLEY CLAMP.
No. 473,459. Patented Apr. 26, 1892.
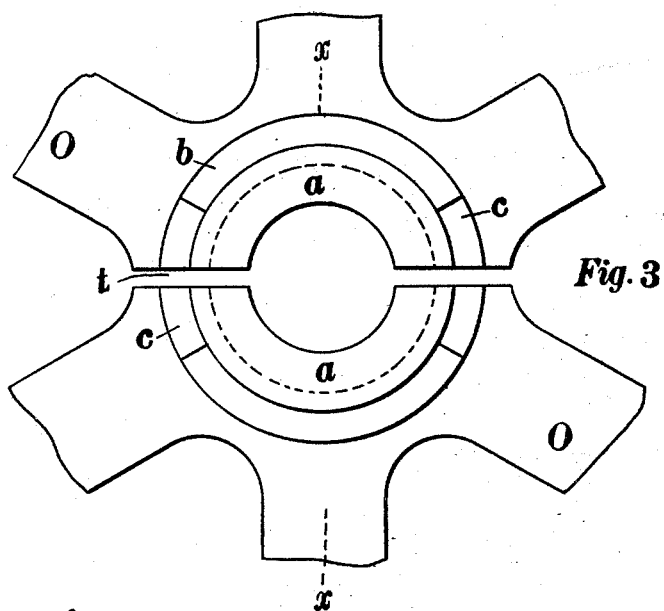
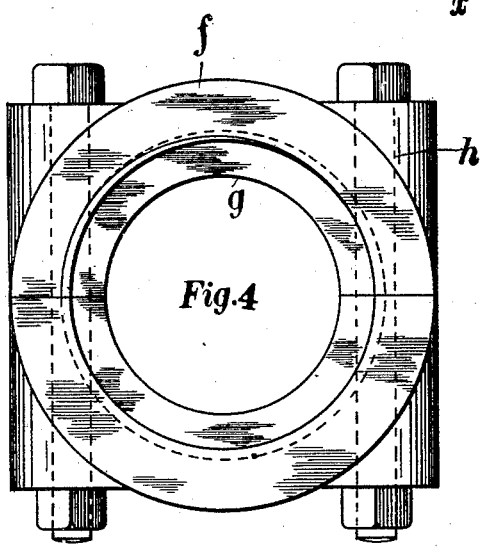
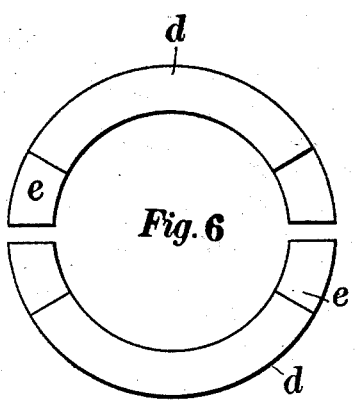
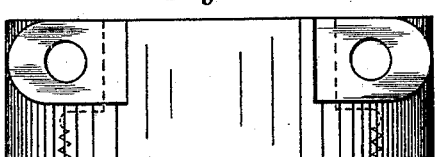
Attest
J. Van Nest Jr.
E. F. Kinsey
Inventor.
John J. Hogan, per
Crane & Miller, Attys.
THE NORRIS PETERS CO., PHOTO-LITHO., WASHINGTON, D. C.

UNITED STATES PATENT OFFICE.

JOHN J. HOGAN, OF BROOKLYN, ASSIGNOR TO THE HOGAN ENGINEERING COMPANY, OF NEW YORK, N. Y.

SPLIT-PULLEY CLAMP.

SPECIFICATION forming part of Letters Patent No. 473,459, dated April 26, 1892.

Application filed June 15, 1891. Serial No. 396,354. (No model.)

*To all whom it may concern:*

Be it known that I, JOHN J. HOGAN, a citizen of the United States, residing at Brooklyn, Kings county, New York, have invented certain new and useful Improvements in Split-Pulley Clamps, fully described and represented in the following specification and the accompanying drawings, forming a part of the same.

The object of this invention is to furnish a clamp for the hubs of split pulleys by which the labor upon the hub may be confined entirely to turning and boring. With my construction no bolts are applied directly to the pulley-hub; but the bolts are applied to clamping-collars fitted over turned bosses upon the ends of the hub. The amount of labor required and the expense of fitting up large split pulleys are thus greatly reduced, as the labor of handling and fitting up the clamping collars is relatively small.

The invention will be understood by reference to the annexed drawings, in which—

Figure 1:
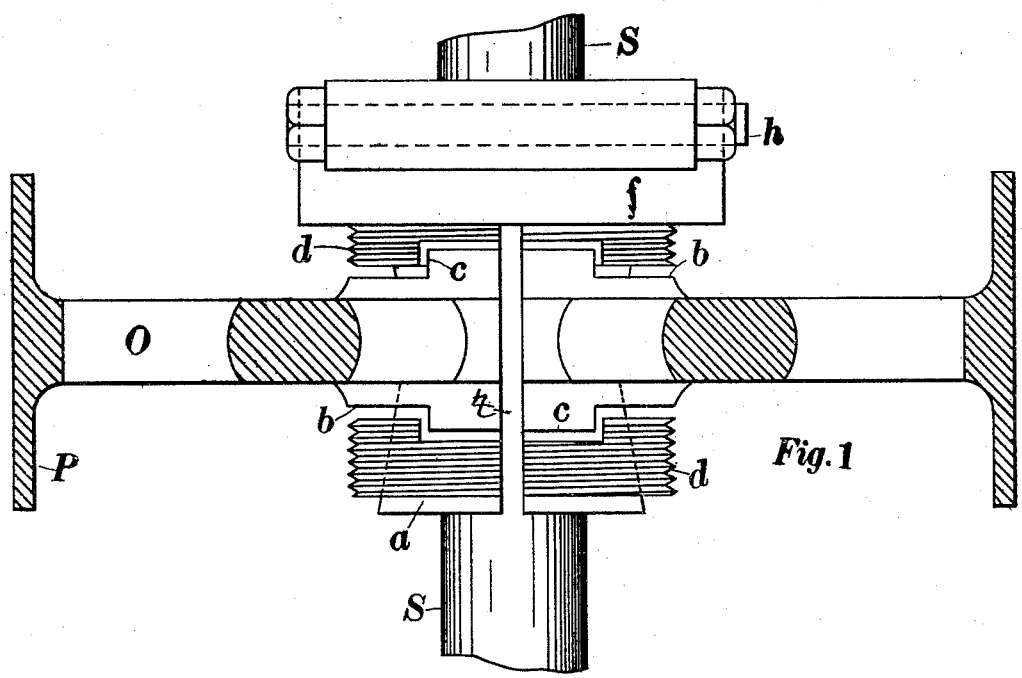
Figure 2:
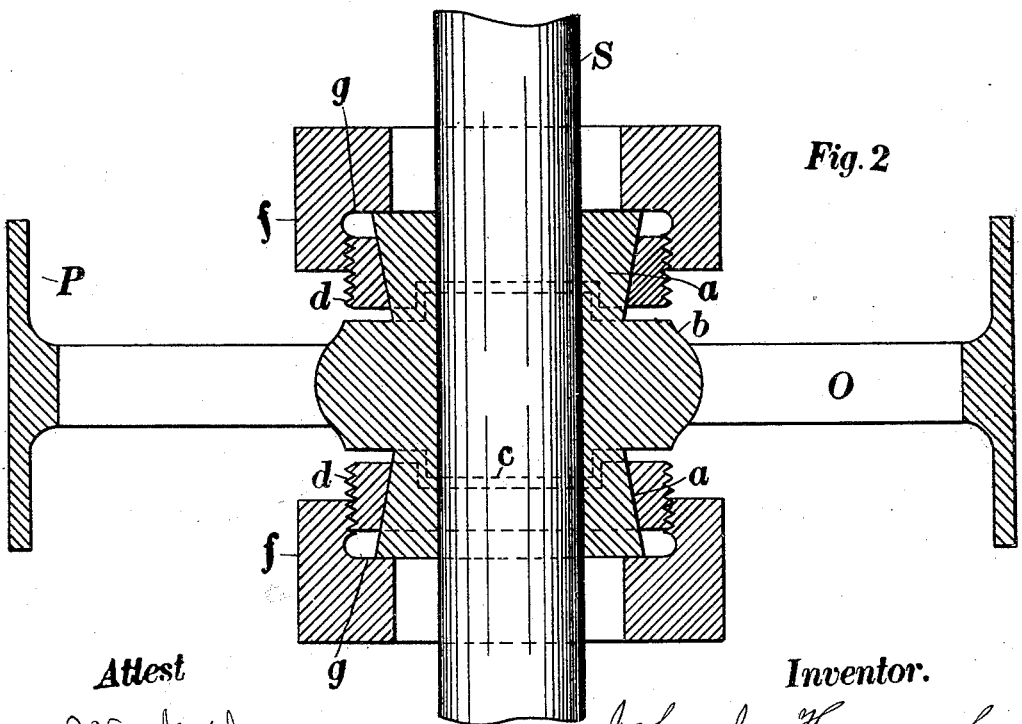

Figure 1 is a plan, partly in section where hatched, of a pulley and its supporting-shaft, with the clamping collar removed from one end of the hub. The diameter of the pulley in relation to the hub is much smaller than it would be in practice for want of room in the drawings. Fig. 2 is a section projected from Fig. 1, including the pulley-rim and two clamping-collars, the section where hatched being taken on line $x\ x$ in Fig. 3. Fig. 3 is an end view of the pulley-hub with parts of the pulley-arms. Fig. 4 is an end view of one of the clamping-collars. Fig. 5 is a plan of the same. Fig. 6 is an end view, and Fig. 7 a plan, of one of the threaded sleeves.

P is the pulley-rim, O the arms which connect it with the hub, and S the supporting-shaft. The rim of a split pulley would of course require to be divided; but the means for connecting the divided rim is not shown herein, as it forms no part of the invention. The hub is formed with a clearance-space $t$, as usual, where it is divided, and bosses $a$ of conical shape are formed upon its opposite ends by tapering the ends inwardly. The face $b$ of the hub at the base of each boss is provided with several projecting lugs $c$. The divided sleeves $d$ are formed internally to fit upon the bosses near their base and are provided externally with a screw-thread to engage a thread upon the interior of the clamping-collars $f$. The clamping-collars are divided upon their diameter and the halves clamped together by bolts $h$. Each collar is formed with an internal flange $g$, adapted to bear upon the end of the boss $a$, and the parts are so proportioned that when they are fitted together, as shown in Fig. 2, the collar may be screwed upon the exterior of the sleeve with the flange $g$ pressed upon the end of the boss, and then operates to draw the sleeve forcibly toward the end of the boss. The divided parts of the sleeve are prevented from turning upon the boss by the lugs $c$ and are prevented from separating when drawn toward the expanded end of the boss by the embracing-collar $f$, and the movement of the sleeve thus operates to press the two halves of the sleeve firmly toward one another to grip the hub and shaft S in the desired manner. The clamping force developed by the mutual action of the screw-thread upon the sleeve and the conical shape of the boss is much greater than would be usually exerted by any style of clamping-bolts, and the two halves of the pulley-hub are therefore clamped to the driving-shaft with the utmost rigidity. By this construction the pulley-hub is not perforated by bolt-holes, nor does it require any finishing, except that which may be imparted to it in the turning-lathe when the hole is bored and the rim is turned. These advantages may be secured by forming the divided collars $f$ internally to fit upon the bosses $a$ on the ends of the hub, such bosses being preferably made conical, as shown in the drawings, to prevent the collars from working off when clamped thereon.

I have claimed herein the combination, with the ends of a split-pulley hub, of divided clamp-collars pressed upon the bosses of the hubs by bolts, as such construction embodies the generic form of the invention; but I prefer in practice to insert the threaded sleeves between the divided collars and the bosses upon the hub, as shown in the drawings.

Having thus set forth the nature of my invention, what I claim is—

1. The combination, with a split-pulley hub provided with bosses at its opposite ends, of divided clamp-collars having their parts secured together by bolts and clamped upon the exterior of the bosses, as and for the purpose set forth.

2. The combination, with a pulley-hub having bosses upon the ends tapered inwardly, as described, of threaded sleeves fitted internally upon the tapering bosses, and divided collars $f$, threaded internally to fit the sleeves and provided with the clamping-bolts and the internal flanges $g$ to bear upon the ends of the bosses, as and for the purpose set forth.

3. The combination, with a pulley-hub having bosses upon the ends tapered inwardly, as described, of threaded sleeves fitted internally upon the tapering bosses, lugs upon the hub to engage the sleeves and hold them from turning, and divided collars $f$, threaded internally to fit the sleeves and provided with clamping-bolts and with the internal flanges $g$ to bear upon the ends of the bosses, as set forth.

JOHN J. HOGAN.

In presence of—
  L. C. DAWES,
  T. S. CRANE.